UNITED STATES PATENT OFFICE.

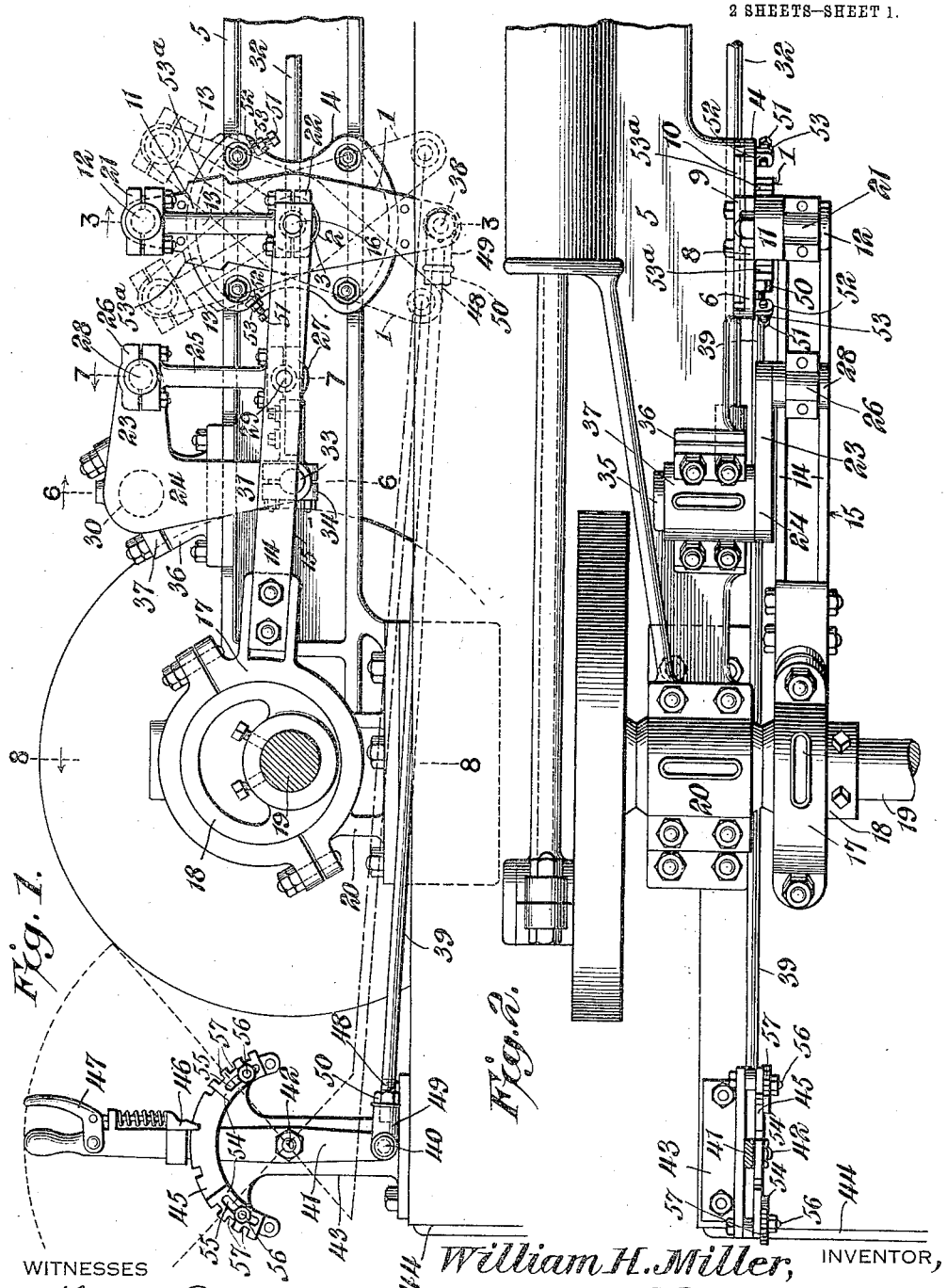

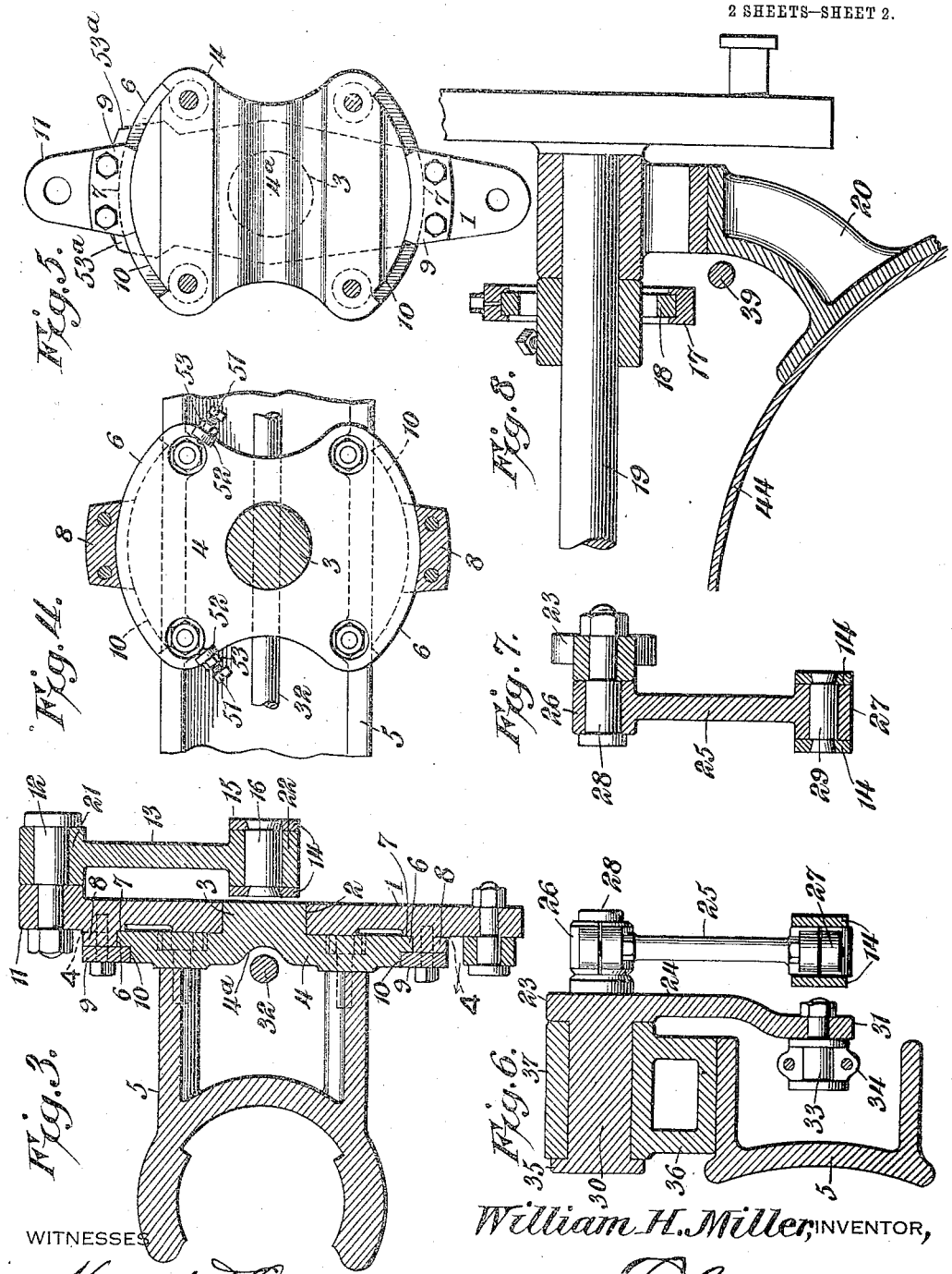

WILLIAM HENRY MILLER, OF MOUNT VERNON, INDIANA, ASSIGNOR TO KECK-GONNERMAN CO., OF MOUNT VERNON, INDIANA, A CORPORATION OF INDIANA.

VALVE-GEAR.

1,125,367.    Specification of Letters Patent.    Patented Jan. 19, 1915.

Application filed August 31, 1914. Serial No. 859,297.

*To all whom it may concern:*

Be it known that I, WILLIAM H. MILLER, a citizen of the United States, residing at Mount Vernon, in the county of Posey and State of Indiana, have invented a new and useful Valve-Gear, of which the following is a specification.

The invention relates to improvements in valve gear.

The object of the present invention is to improve the construction of valve gear and to provide a simple, practical, and efficient valve gear of strong and durable construction, in which all of the moving parts will be mounted on the engine frame and none bolted to the boiler, thereby preventing any unequal expansion of the engine frame and the boiler from affecting the valve gear or distorting the adjustment of the valve movement.

A further object of the invention is to provide a valve gear equipped with means for adjustably limiting the movement of the reverse link and for adjusting the means for locking the reverse lever, whereby the reverse link may be rigidly held against a stop when at the limit of its movement in either direction.

With these and other objects in view the invention consists in the construction and novel combination of parts hereinafter fully described, illustrated in the accompanying drawings, and pointed out in the claims hereto appended, it being understood that various changes in the form, proportion size and minor details of construction, within the scope of the claims, may be resorted to without departing from the spirit or sacrificing any of the advantages of the invention.

In the drawings:—Figure 1 is a side elevation of a valve gear constructed in accordance with this invention. Fig. 2 is a plan view of the same. Fig. 3 is a vertical sectional view on the line 3—3 of Fig. 1. Fig. 4 is a detail sectional view taken substantially on the line 4—4 of Fig. 3. Fig. 5 is a detail view of a supporting plate and the reverse link. Fig. 6 is a transverse sectional view on the line 6—6 of Fig. 1. Fig. 7 is a similar view on the line 7—7 of Fig. 1. Fig. 8 is a transverse sectional view on the line 8—8 of Fig. 1.

Like numerals of reference designate corresponding parts in all the figures of the drawings.

In the accompanying drawings, in which is illustrated the preferred embodiment of the invention, the valve gear comprises in its construction a centrally pivoted reverse link 1, having a central opening 2 and mounted on a horizontal pivot stud 3 of a supporting plate 4. The supporting plate 4, which is bolted or otherwise secured to an engine frame 5, has arcuate upper and lower guiding edges 6, arranged concentric with the pivot stud 3, and fitting in arcuate upper and lower recesses 7 of enlargements 8 of the reverse link 1, which is retained on the pivot stud by upper and lower plates 9. The enlargements 8 project from the rear or inner face of the reverse link and the plates 9, which are bolted or otherwise secured to the said enlargements 8, project from the same at the recesses 7 and extend into arcuate recesses 10 of the supporting plate 4. The recesses 10 are formed in the rear face of the supporting plate 4 and the projecting portions of the plates 9 coöperate with the recesses 7 of the reverse link to form grooves to receive the arcuate upper and lower guiding edges 6 of the supporting plate 4.

The upper end 11 of the reverse link is enlarged at the front to form a projecting portion, and it has pivoted to it, by a pin 12, the upper end of a radius link 13, which has its lower end pivoted between spaced sides or members 14 of an eccentric rod 15, by a pin 16. The spaced sides or members of the eccentric rod are secured to a strap 17 of an eccentric 18, mounted on the engine shaft 19, which is journaled in a suitable bearing 20 of the engine frame 5. The radius link is equipped at its upper and lower ends with bearing boxes 21 and 22 having adjustable caps or sections adapted to take up the wear without affecting the adjustment of the valve gear. The eccentric rod is connected at an intermediate point with an approximately horizontal arm 23 of a bell crank 24 by a link 25, provided at its upper and lower ends with adjustable bearing boxes 26 and 27 receiving pivots 28 and 29, which connect the link 25 to the bell crank and to the eccentric rod. The upper pivot 28 projects from the side face of the bell crank and the lower end of the link 25 is mounted between the sides or members of the eccentric rod. The bell crank, which is provided at its angle with an integral pivot 30, has a pendent approximately vertical arm 31, of greater length than the arm 23, and connected with the valve rod 32 by a pin 33. The valve rod, which is equipped with an adjustable bearing box 34 for taking up the wear, is located at the inner or rear face of the supporting plate 4, which has a central recess 4ᵃ to provide the necessary clearance for the valve rod. The pivot 30 of the bell crank has a head 35 and is arranged in a bracket bearing 36, mounted upon the engine frame and provided with an adjustable cap 37 to take up the wear on the pivot 30. As the bell crank, the supporting plate 4, and the engine shaft are all mounted on the engine frame, no unequal expansion will tend to distort and affect the valve motion.

The lower end of the reverse link is pivoted by a pin 38 to one end of a reach rod 39, which has its other end connected by a pin 40 to the lower end of a reverse lever 41, pivoted at an intermediate point by a pin 42 to a bracket 43, mounted upon the boiler 44 and carrying a notched segment 45. The notched segment 45 is engaged by a spring actuated dog or detent 46, which is controlled by a latch lever 47. The reach rod 39, which has threaded terminals 48, is equipped at its end with adjustable sections 49, which are secured in their adjustment by lock nuts 50. The reverse lever is adapted to be operated to swing the reverse link from the central position illustrated in full lines in Fig. 1 of the drawing to the forward or rearward dotted line position shown in the said figure, and any number of notches may be provided in the segment 46 for securing the reverse link at various intermediate adjustments.

The supporting plate 4 is provided at opposite sides of its upper portion with adjustable stops consisting of screws 51 mounted in threaded openings of lugs 52 and arranged in the path of the reverse link 1. The lugs 52, which are located at the side edges of the supporting plate 4, are formed integral with the same, and the screws 51, which limit the movement of the reverse link, are adjustable to enable the reverse link to be arranged in proper position at the limit of its movement in either direction. The screws 51 are locked in their adjustment by nuts 53 arranged to engage the outer faces of the lugs. The reverse link is provided at its upper portion with lateral enlargements 53ᵃ, forming shoulders for engaging with the adjusting screws.

In order to enable the means for locking the reverse lever to be adjusted to correspond with any adjustment of the reverse link, so that the latter may be held rigidly against one of the adjustable stops when at the limit of its movement in either direction, the notched segment 45 is equipped at its ends with arcuate latch plates 54, provided with curved slots 55 arranged concentric with the pivot bolt 42 of the reverse lever and receiving bolts 56, which clamp the latch plates in their adjustment. The latch plates, which are provided at their upper or outer edges with notches 57, are adjustable inwardly and outwardly to arrange the notches 57 in proper position to be engaged by the dog or detent 46 of the reverse lever, so that the latter may be locked in a position for holding the reverse link firmly against either adjustable stop.

The reverse link controls the movement of the valve and the difference in the length of the arms of the bell crank provides for lap and lead. On starting the engine, the eccentric revolves and gives motion to the valve gear. When the reverse lever and the reverse link occupy a central position, the valve moves only the amount of the lap given to it. That is, the valve moves in a half a revolution of the engine from one port opening at one end of the cylinder to the port opening at the opposite end of the cylinder, giving the proper lead at either end, and the engine, in this position of the valve gear, remains stationary. By moving the reverse lever forward, the reverse link, carrying the radius link, is also moved forward. When in this position the valve has full travel, and opens the ports wide at each end of the cylinder. By reversing the lever 41, the movement is reversed, and the engine travels in the opposite direction, with the same amount of port opening. The increased movement of the valve rod, due to the relative lengths of the bell crank, maintains a proper lead at each end of the stroke of the valve, which opens and cuts off at the same point of piston travel during each revolution of the engine. The movement of the short arm 23 of the bell crank, which is connected with the eccentric rod, being less than the movement of the rod, and arm 31, which is connected with the valve rod, enables the angle of the reverse link to be reduced, thereby providing an easier movement of the radius link and causing the valve to open rapidly, dwell in its open position, and close rapidly. This permits the steam to fill the cylinder of the engine to almost boiler pressure, and insures a maximum amount of power.

What is claimed is:—

1. A valve gear including a supporting plate provided with opposite arcuate edges, a reverse link pivoted to the supporting plate concentrically with the arcuate edges and provided with means for interlocking it with the same, a radius link carried by the reverse link, and means for actuating the radius link.

2. A valve gear including a supporting plate having a centrally pivoted stud and provided with arcuate guiding edges arranged concentric with the said stud, a reverse link mounted on the pivot stud and provided with means for interlocking it with the said arcuate edges, whereby it is guided in its adjustment and retained on the stud, a radius link carried by the reverse link, and means for actuating the radius link.

3. A valve gear including a supporting plate having opposite arcuate edges, a reverse link pivoted to the supporting plate concentric with the arcuate edges and provided with spaced projecting portions having recesses receiving the said edges, plates mounted on the reverse link and engaging the said supporting plate at the arcuate edges thereof, a radius link carried by the levers, and means for actuating the radius link.

4. A valve gear including an intermediately pivoted reverse link having upwardly and downwardly extending arms, a radius link pivotally connected at its upper end to the upper arm of the reverse link, a reverse lever, a reach rod connected with the reverse lever and with the lower arm of the reverse link, and means for actuating the radius link.

5. The combination with an eccentric rod, of a valve gear including an upright supporting plate having arcuate upper and lower edges, a central pivot carried thereby, a reverse link mounted at an intermediate point on the said pivot and having upper and lower arms slidably interlocked with the said arcuate edges, a radius link carried by the upper arm of the reverse link and connected with the eccentric rod, a reverse lever, and a reach rod located below the eccentric rod and connected with the reverse lever and with the lower arm of the reverse link.

6. A valve gear including a pivotally mounted reverse link, a radius link carried by the reverse link, an adjustable stop for limiting the movement of the reverse link, a reverse lever connected with the reverse link, means for locking the reverse lever, said locking means being adjustable to correspond with the adjustment of the said stop, whereby the reverse link may be rigidly held against the stop in any adjustment thereof, and means for actuating the radius link.

7. A valve gear including a pivotally mounted reverse link, a radius link carried by the reverse link, an adjustable stop for limiting the movement of the reverse link, a reverse lever connected with the reverse link, a dog or detent carried by the reverse lever, a notched plate arranged to be engaged by the dog or detent and adjustable to correspond with the adjustment of the said stop, whereby the reverse lever may be locked in a position for holding the reverse link firmly against the stop in any adjustment of the latter, and means for actuating the radius link.

8. A valve gear including a pivotally mounted reverse link, a radius link carried by the reverse link, an adjustable stop for limiting the movement of the reverse link, a reverse lever connected with the reverse link, a dog or detent carried by the reverse lever, a notched segment, an arcuate plate adjustably mounted on the segment, said plate being also notched and arranged to be engaged by the dog or detent, and means for actuating the radius link.

9. A valve gear including a supporting plate provided at opposite sides with lugs, a reverse link pivoted to the supporting plate and movable between the said lugs, adjusting screws mounted in the lugs and arranged to limit the movement of the reverse link, a reverse lever connected with the reverse link, a dog or detent carried by the reverse lever, a notched segment, and arcuate plates adjustably mounted on the segment at the terminal portions thereof and provided with notches arranged to be engaged by the dog or detent.

In testimony, that I claim the foregoing as my own, I have hereto affixed my signature in the presence of two witnesses.

WILLIAM HENRY MILLER.

Witnesses:
 Louis D. Keck,
 Wm. H. Gonnerman.

Copies of this patent may be obtained for five cents each, by addressing the "Commissioner of Patents, Washington, D. C."